US006979415B1

(12) United States Patent
Krishna et al.

(10) Patent No.: US 6,979,415 B1
(45) Date of Patent: Dec. 27, 2005

(54) LUMINESCENT NANOMATERIALS POWDERS HAVING PREDETERMINED MORPHOLOGY AND METHOD OF MAKING

(75) Inventors: Kalaga Murali Krishna, Bangalore (IN); Mohan Manoharan, Niskayuna, NY (US); Geetha Karavoor, Kasaragod (IN); Shweta Saraswat, Karnataka (IN); Sergio Paulo Martins Loureiro, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/815,900

(22) Filed: Mar. 31, 2004

(51) Int. Cl.⁷ .............................................. C09K 11/81

(52) U.S. Cl. ................. 252/301.4 P; 423/263

(58) Field of Search ................... 252/301.4 P; 423/263

(56) References Cited

U.S. PATENT DOCUMENTS 5,580,490 A * 12/1996 Collin et al. ......... 252/301.4 P

FOREIGN PATENT DOCUMENTS

EP 0395775 11/1990

OTHER PUBLICATIONS

Riwotzki et al, Liquid-Phase Synthesis of Colloids and Redispersible Powders of Strongly Luminescing LaPO4:Ce, Tb Nanocrystals:, Angew. Chem. Int. Ed. vol. 40, No. 3, 2001, pp. 573-576.*

Karsten Kiwotzki, Heike Meyssamy, Heimo Schnablegger, Andreas Kornowski, and Markus Haase, Title: "Liquid-Phase Synthesis of Colloids and Redisperable Powders of Strongly Luminescing LaPO4:Ce,Tb Nanocrystals"; WILEY-VCH Verlag GmbH, D-69451 Weinheim, 2001; Angrew. Chem. Int. Ed. 2001, 40, No. 3; p.p. 573-576.

* cited by examiner

*Primary Examiner*—C. Melissa Koslow
(74) *Attorney, Agent, or Firm*—Fletcher Yoder

(57) ABSTRACT

A method of making a luminescent nanomaterial having a plurality of nanoparticles. The luminescent nanomaterial includes at least one lanthanide group metal phosphate and at least one lanthanide series dopant, wherein each of the plurality of nanoparticles has a predetermined morphology. The luminescent nanomaterial has a high quantum efficiency and a high absorption value. The method yields a variety of morphologies and sizes of the plurality of nanoparticles. The particles size of the luminescent material varies from tens of nanometers to a few hundred of nanometers.

59 Claims, 3 Drawing Sheets

LUMINESCENT NANOMATERIALS POWDERS HAVING PREDETERMINED MORPHOLOGY AND METHOD OF MAKING

BACKGROUND OF THE INVENTION

The invention relates to luminescent nanomaterials. More particularly, the invention relates to luminescent nanomaterials comprising a plurality of nanoparticles.

Luminescent materials, also known as phosphors, are used in lighting applications. Phosphors are responsible for nearly all the light output from the lamp. The efficiency of the phosphors to convert incident non-visible radiation into visible light depends on the size, shape, and morphology of the phosphor particles. Consequently, efforts have been directed toward producing luminescent materials with controlled properties.

Currently, such luminescent materials comprise particles in the micron size regime. Since their dimension is more than, or of the same order of magnitude as ¼ wavelength of the absorbed incident radiation, emitted radiation, or both, the particles act as individual scattering centers for such radiation, thereby reducing the efficiency of the phosphor due to optical losses.

Various synthesis routes, such as sol-gel, colloidal, precipitation, combustion synthesis, and solid state methods have been adopted to produce powders of luminescent materials. To date, however, none of the methods have yielded luminescent materials having selected morphologies that provide optimal efficiency and absorption.

Available synthesis methods fail to provide a method of making sub-micron size luminescent materials having tailored morphology that provides optimal efficiency and absorption. Therefore, what is needed is a luminescent material having a particle size and predetermined or 'engineered' morphology that will optimize both the efficiency and absoprtion of the material. What is also needed is a method of making such a luminescent material, wherein the method provides a means of controlling the morphology of the material.

SUMMARY OF THE INVENTION

The present invention meets these and other needs by providing luminescent nanomaterials comprising a plurality of nanoparticles. The luminescent nanomaterial has at least one lanthanide group metal phosphate and at least one dopant from the lanthanide series, wherein each of the plurality of nanoparticles has a predetermined morphology. The luminescent nanomaterial has high quantum efficiency and high absorption values. The invention also provides a method of making such nanoparticles. The method yields a variety of morphologies. The particle size of the nanoparticles varies from tens of nanometers to a few hundred of nanometers.

Accordingly, one aspect of the invention is to provide a luminescent nanomaterial. The luminescent nanomaterial comprises a plurality of nanoparticles. The plurality of nanoparticles comprises at least one lanthanide group metal phosphate and at least one lanthanide series dopant, wherein each of the plurality of nanoparticles has a predetermined morphology.

Another aspect of the invention is to provide a luminescent nanomaterial comprising a plurality of nanoparticles. The plurality of nanoparticles comprises at least one lanthanide group metal phosphate and at least one lanthanide series dopant, wherein each of the plurality of nanoparticles has a predetermined morphology. The method comprises the steps of: forming a homogenized precursor solution of at least one lanthanide group metal precursor and at least one lanthanide series dopant precursor; adding a phosphate source and a fuel to the precursor solution; removing water from the precursor solution to leave a reaction concentrate; and igniting the reaction concentrate to form a powder comprising the plurality of nanoparticles.

Yet another aspect of the invention is a luminescent nanomaterial comprising a plurality of nanoparticles and having a quantum efficiency in a range from about 80% to about 100% with an absorption value of at least 80%. The plurality of nanoparticles comprises at least one lanthanide group metal phosphate and at least one lanthanide series dopant, wherein each of the plurality of nanoparticles has a predetermined morphology. The method comprises the steps of: forming a homogenized precursor solution of at least one lanthanide group metal precursor and at least one lanthanide series dopant precursor; adding a phosphate source and a fuel to the precursor solution; removing water from the precursor solution to leave a reaction concentrate; and igniting the reaction concentrate to form a powder comprising the plurality of nanoparticles.

Another aspect of the invention is to provide the method of making luminescent nanomaterial comprising a plurality of nanoparticles having at least one lanthanide group metal phosphate and at least one lanthanide series dopant, wherein said plurality of nanoparticles has a predetermined morphology. The method comprises the steps of: forming a homogenized precursor solution of at least one lanthanide group metal precursor and at least one lanthanide series dopant precursor; adding a phosphate source and a fuel to the precursor solution; removing water from the precursor solution to leave a reaction concentrate; and igniting the reaction concentrate to form a powder comprising the plurality of nanoparticles.

These and other aspects, advantages, and salient features of the present invention will become apparent from the following detailed description, the accompanying drawings, and the appended claims.

DETAILED DESCRIPTION OF THE INVENTION

Figure 1:
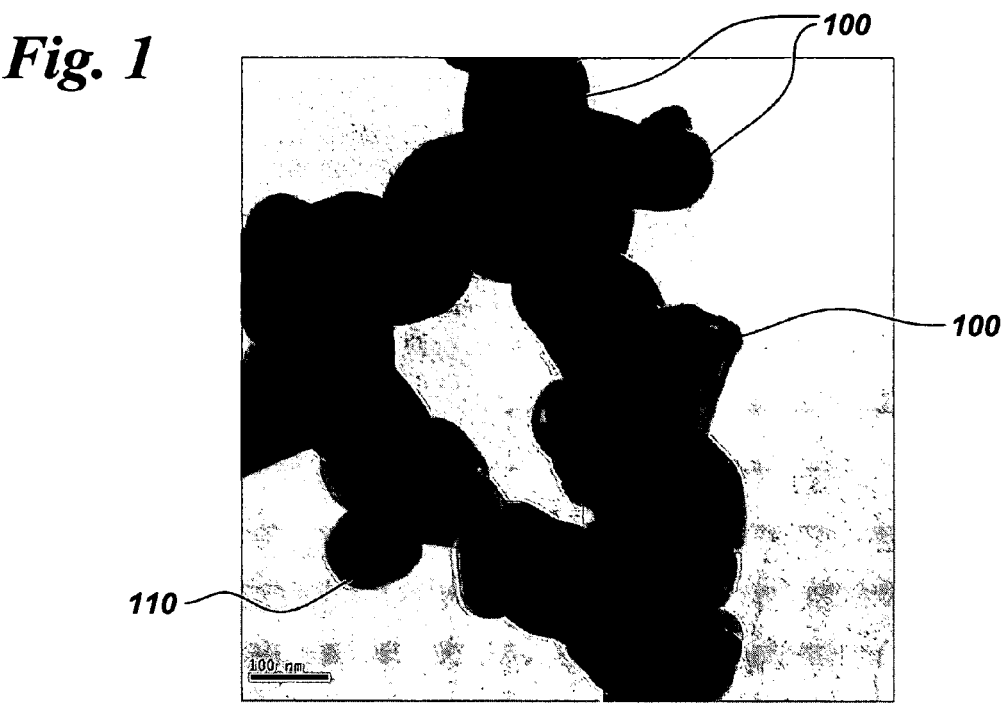
FIG. 1 is a transmission electron microscopy (TEM) image of a lanthanum phosphate doped with cerium and terbium having a spheroidal morphology.

In the following description, like reference characters designate like or corresponding parts throughout the several views shown in the figures. It is also understood that terms such as "top," "bottom," "outward," "inward," and the like are words of convenience and are not to be construed as limiting terms.

Figure 2:
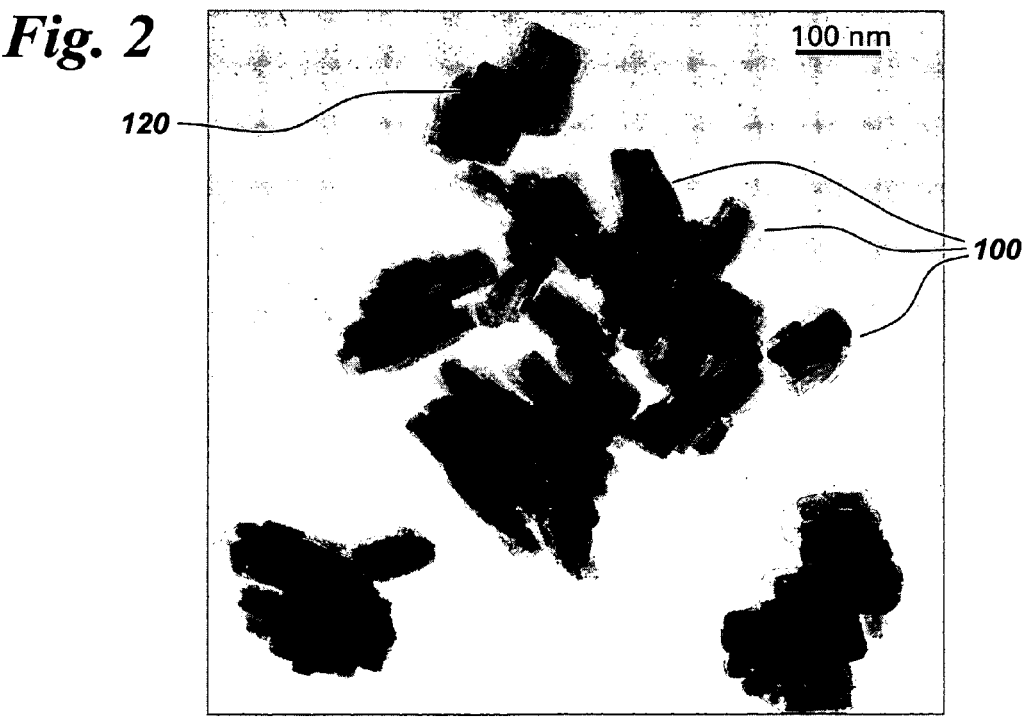
FIG. 2 is a TEM image of a lanthanum phosphate doped with cerium and terbium having an elongated platelet morphology.
Figure 3:
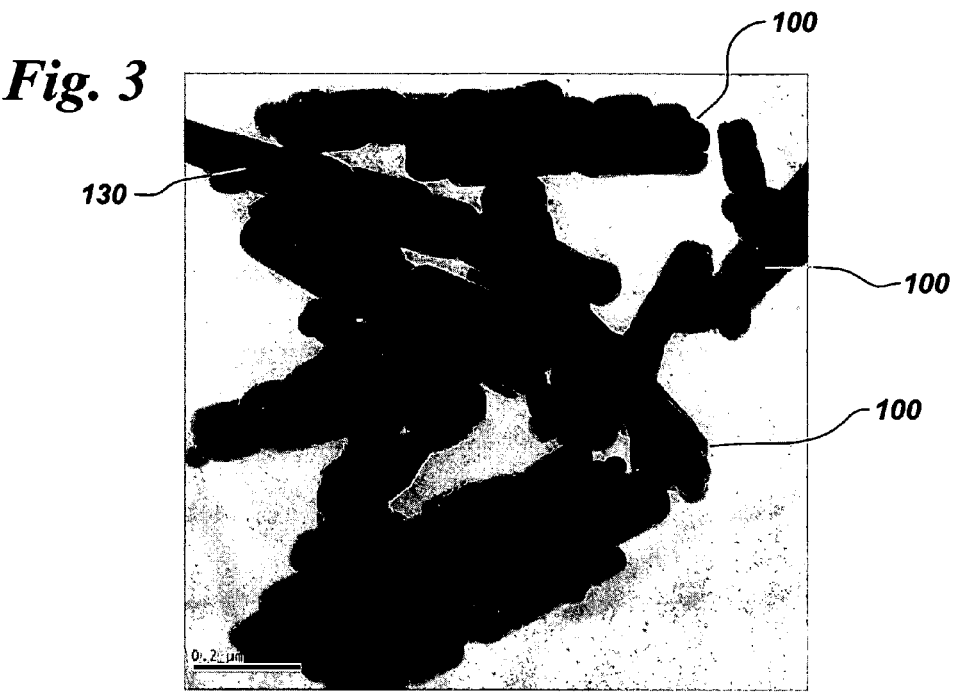
FIG. 3 is a TEM image of a gadolinium lanthanum phosphate doped with cerium and terbium having a rod-like morphology.

Referring to the drawings in general, it will be understood that the illustrations are for the purpose of describing different embodiments of the invention, and are not intended to limit the invention thereto. Turning to FIG. 1, a luminescent nanomaterial of the present invention is shown. FIG. 1 is a transmission electron microscopy (TEM) image of a lanthanum phosphate doped with cerium and terbium. The luminescent nanomaterial 100 comprises a plurality of nanoparticles. Each of the nanoparticles has a spheroidal morphology 110. The plurality of nanoparticles comprises at least one lanthanide group metal phosphate and at lease one lanthanum series dopant. The luminescent nanomaterial 100 comprises one of a spheroidal morphology 110, an elongated platelet morphology 120, rod-like morphology 130, or combinations thereof. Each of the plurality of nanoparticles has at least one of the three dimension in a range from about 5 nm to about 500 nm. In one embodiment, each of the plurality of nanoparticles has at least one dimension in a range from about 10 nm to about 200 nm. In a preferred embodiment, each of the plurality of nanoparticles has at least one dimension in a range from about 50 nm to about 100 nm. FIG. 2 is a TEM image of lanthanum phosphate doped with cerium and terbium nanoparticles having an elongated platelet morphology 120. FIG. 3 is a TEM image of gadolinium lanthanum phosphate doped with cerium and terbium nanoparticles having a rod-like morphology 130.

Figure 4:
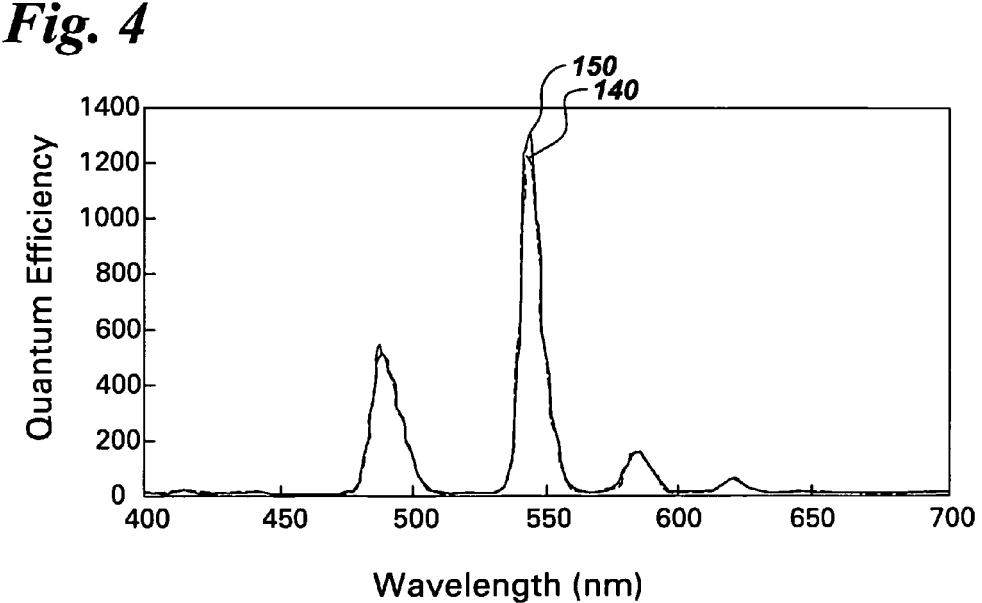
FIG. 4 is a photoluminescence emission spectrum of a gadolinium lanthanum phosphate doped with cerium and terbium with respect to green phosphor standard.

To exhibit good photoluminescent properties, luminescent nanomaterial 100 should have a high quantum efficiency. The quantum efficiency of the luminescent nanomaterial 100 is measured against a green phosphor standard (commercially available from Nichia: NP 220-13-70). The green phosphor standard has an average particle size of about 4 microns. The luminescent nanomaterial 100 and the green phosphor standard are excited using 254 nm ultraviolet radiation and the emission is measured for a peak at about 544 nm. The quantum efficiency of the green phosphor standard is assumed to be 100%. Hence, a material having an absolute quantum efficiency equal to that of the green phosphor standard will have a 100% quantum efficiency according to this convention. Absorption values of the luminescent nanomaterial 100 and the green phosphor standard were calculated by measuring the spectral reflectance in the range of 240 nm to 270 nm against a $BaSO_4$ standard. FIG. 4 shows a photoluminescence emission spectrum 140 of gadolinium lanthanum phosphate doped with cerium and terbium with respect to the photoluminescence spectrum 150 of the green phosphor standard. The luminescent nanomaterial 100 has a quantum efficiency in the range from about 80% to about 100% with an absorption value of at least 80%. In one embodiment, the luminescent nanomaterial 100 has a quantum efficiency in a range from about 80% to about 90% with absorption value of at least 80%. In another embodiment, the luminescent nanomaterial 100 has a quantum efficiency in a range from about 90% to about 100% with an absorption value of at least 80%. In yet another embodiment, the luminescent nanomaterial has a quantum efficiency of at least 100% with an absorption value of at least 80%.

As previously described herein, particles having a dimension that is greater than or of the same order of magnitude as ¼ wavelength of the absorbed radiation, the emitted radiation, or both act as individual scattering centers for such radiation. Such scattering leads to optical losses. The luminescent nanomaterials 100 of the present invention comprise a plurality of nanoparticles that are smaller than the ¼ wavelength of both the incident and emitted radiation. Therefore, the nanoparticles do not act as scattering centers for radiation. Consequently, the luminescent materials provided by the present invention exhibit reduced optical losses and are more efficient in lighting applications.

The luminescent nanomaterial 100 comprises at least one lanthanide group metal phosphate which acts as a host lattice, i.e., the basic matrix is formed by the at least one lanthanide group metal phosphate. In one embodiment, the lanthanide group metal phosphate comprises at least one of gadolinium phosphate, lanthanum phosphate, gadolinium lanthanum phosphate, and combinations thereof. In this particular embodiment, at least one of lanthanum and gadolinium phosphate forms a host lattice; i.e., the basic matrix is at least one of lanthanum phosphate and gadolinium phosphate, and another lanthanide ion substitutes into the host lattice. In this particular embodiment, the mole percent of the lanthanide group metal phosphate acting as the host lattice is in a range from about 35 mole percent to about 95 mole percent, and the mole percent of the other lanthanide group metal phosphate that substitutes into the host lattice is in a range from about 0 mole percent to about 30 mole percent. In a particular embodiment, the mole percent of gadolinium substituent in the lanthanum phosphate host lattice is in a range from about 0 mole percent to about 30 mole percent and the mole percent of lanthanum is in a range from about 35 mole percent to about 95 mole percent. In a preferred embodiment, the mole percent of gadolinium in the lanthanum phosphate host lattice is up to about 30 mole percent and the lanthanum mole percent is in a range from about 35 mole percent to about 60 mole percent. In another embodiment, the lanthanum mole percent in the gadolinium phosphate host lattice is up to about 30 mole percent and the gadolinium mole percent is in a range from about 35 mole percent to about 95 mole percent. In a preferred embodiment, the mole percent of lanthanum substituent in the gadolinium phosphate host lattice is up to about 30 mole percent and the mole percent of gadolinium is in a range from about 35 mole percent to about 60 mole percent.

The host lattice typically contains at least one luminescent center, also referred to as an activator ion. Exciting radiation is absorbed by the activator ion. The activator ion is raised to an excited state, and then returns to ground state by emitting radiation. An additional ion, referred to as a sensitizer, can be added to the host lattice to absorb the exciting radiation and transfer it to the activator ion. The luminescent nanomaterial 100 comprises at least one lanthanide series dopant which acts either as a sensitizer, an activator ion, or both. In one embodiment, the lanthanide series dopant comprises cerium, which acts as a sensitizer, and terbium, which acts as an activator ion. In this particular embodiment, each lanthanide series dopant is present in a range from about 1 mole percent to about 30 mole percent in the host lattice. In a preferred embodiment, cerium and terbium are each present in a range from about 4 mole percent to about 30 mole percent.

Figure 5:
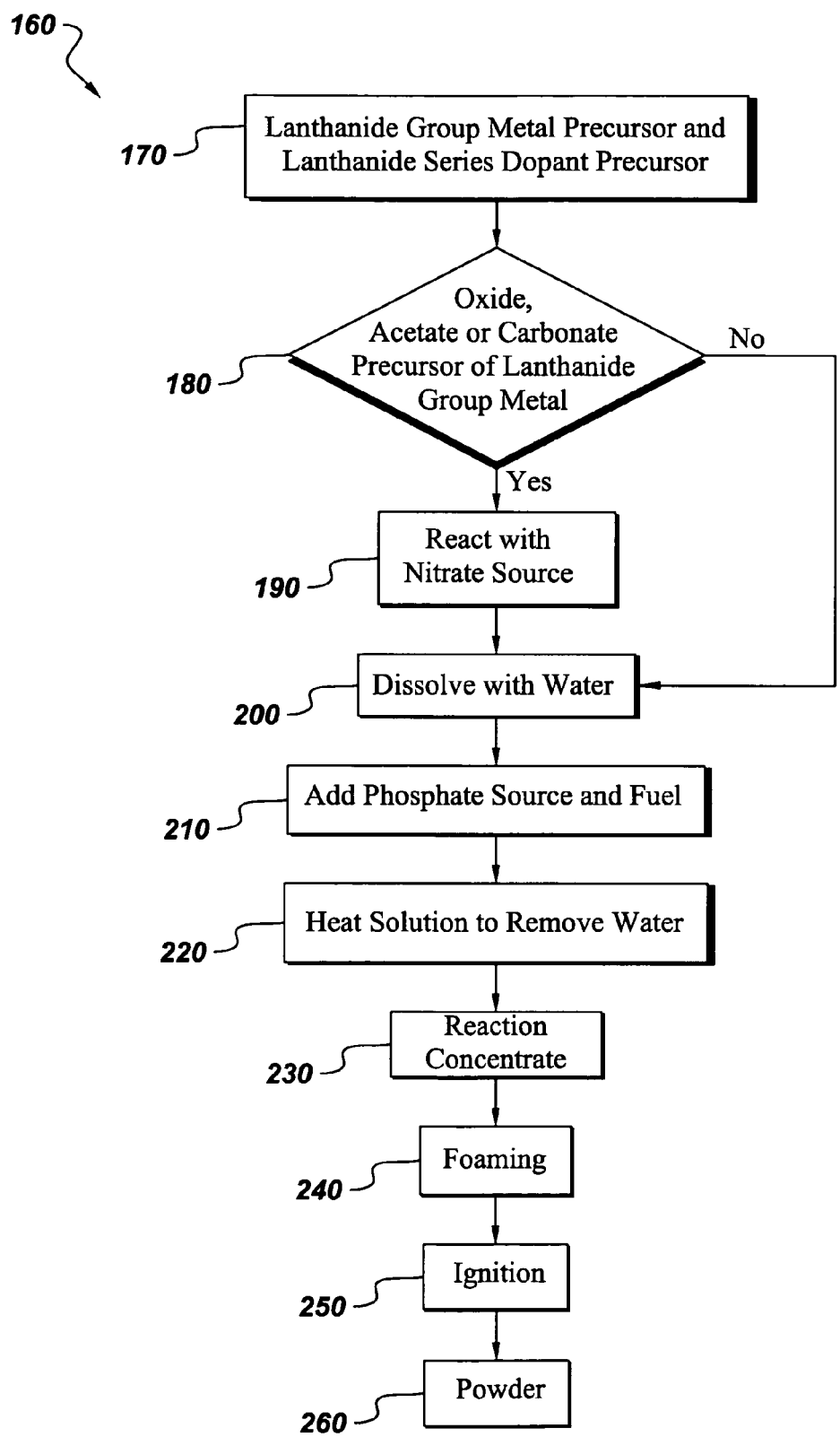
FIG. 5 is a flow chart illustrating the method for making a luminescent nanomaterial.

Another aspect of the present invention is to provide a method for synthesis of luminescent nanomaterial 100 comprising a plurality of nanoparticles. The luminescent nanomaterial 100 comprises at least one lanthanide group metal phosphate and at least one lanthanide series dopant, wherein each of the plurality of nanoparticles has a predetermined morphology as described hereinabove. The method of making luminescent material 100 is represented in FIG. 5 as a flow chart. The method of making the luminescent material 100 is based on the principles of combustion synthesis. Combustion synthesis is a useful, cost effective technique for materials synthesis and processing. A further advantage of this method is that it reduces the need for a hydrogen reduction step to stabilize the lanthanum series dopants in the preferred valence state for luminescence. Unlike previously known methods, method 160 described herein provides a process control over the properties of the synthesized product.

The method summarized in FIG. 5 begins with step 170, in which stoichiometric amounts of at least one lanthanide group metal precursor and at least one lathanide series dopant precursor are provided. Non-limiting examples of lanthanide group metal precursors and lanthanide series dopant precursors include, but are not limited to, oxides, nitrates, acetates, and carbonates of lanthanide group metals. The oxide, carbonate, and acetate precursors of lanthanide group metals and lanthanide series dopants are hereinafter referred to as "non-nitrate precursors".

The exact methodology adopted in the method depends on the chemical species that are used as precursors. For example, nitrate and non-nitrate precursors of the lanthanide group metal are separated in step 180 so as to allow further processing, depending on the precursor type.

Following separation, a non-nitrate precursor, when used is reacted with a nitrate source, such as, but not limited to, nitric acid and ammonium nitrate in step 190. As a result of this exothermic reaction, the non-nitrate precursor is converted to a lanthanide nitrate.

In step 200, the nitrate precursor of the lanthanum group metal and the converted lanthanide nitrate from step 190 are dissolved in water to form an aqueous solution, which is then homogenized by stirring. Further, the pH of the solution is maintained by controlling the ratio of water and nitric acid. In one embodiment, the pH of the homogenized precursor solution is maintained in a range from about 0.5 to about 5. In a preferred embodiment, the pH of the homogenized precursor solution is maintained in a range from about 1 to about 3.5.

In step 210, a phosphate source is added to the homogenized precursor solution of step 200 to form the lanthanide group metal phosphate. Non-limiting examples of the phosphate source include di-ammonium hydrogen phosphate, phosphoric acid, and boron phosphate. Depending on the pH, the homogenized precursor solution is either clear, translucent, or milky. A relationship between the morphology of the luminescent nanomaterial 100 and the pH of the homogenized precursor solution is observed. A spheroidal morphology 110 is achieved for pH values of less than 1.0. A combination of a spheroidal morphology 110 and an elongated platelet morphology 120 is obtained for pH values in a range from about 1.0 to about 2.5. An elongated platelet morphology 120 is observed for pH values in a range from about 2.5 to about 3.5. In addition, fuel is added to the homogenized precursor solution to provide the source for ignition of the homogenized precursor solution. In some embodiments the fuel is a carbon source. Non-limiting examples of fuel include glycine, urea, and hydrazine.

In step 220, water is removed from the homogeneous precursor solution formed in step 210. In one embodiment, the homogeneous precursor solution is heated by placing at a hot plate that is maintained at a temperature in a range from about 200° C. to about 500° C. In a preferred embodiment, the temperature of the hot plate is in a range from about 200° C. to about 300° C. Alternatively, the homogeneous precursor solution may be heated in a furnace or a microwave oven. The heating of the homogeneous precursor solution is followed by boiling, in step 230, to remove water, leaving behind a reaction concentrate comprising a slurry or paste containing reaction product. In step 240, further heating the reaction concentrate leads to foaming of the reaction concentrate. Foaming of the reaction concentrate is accompanied by evolution of gases formed as a result of conversion of nitrates to phosphates. In step 250, foaming is followed by ignition. In one embodiment, the foaming product ignites and flames to produce a voluminous, fluffy powder comprising the plurality of nanoparticles. In another embodiment, foaming is followed by smoldering of the reaction concentrate, no flame is observed in this case, although the foaming product turns red hot and smokes. Yellow smoke is observed when urea is used as a fuel, whereas black/brown smoke is observed when glycine is used as a fuel.

In step 260, a powder comprising the luminescent material 100 is obtained as a result of the exothermic reactions described above. It is typical for the process to progress from step 220 to step 260 in about 15 minutes.

After completion of the exothermic reaction, the powder comprising the plurality of nanoparticles is homogenized (not shown in FIG. 5). Homogenization of the powder is completed by means known in the art, such as grinding, milling, and the like.

The size of each of the plurality of nanoparticles obtained by method 160 depends on the flame temperature, which in turn is effected by the fuel-to-oxidizer ratio. The fuel-to-oxidizer ratio may be varied from about 2:1 to about 1:2. The nitrate precursors of the lanthanide group metal act as the oxidizer. In the case where an insufficient amount of oxidizer is present in the homogeneous precursor solution, oxidizers, such as, but not limited to, ammonium nitrate, are added to the solution.

In one embodiment, the powder comprising the plurality of nanoparticles is stabilized. Stabilization includes crystal growth and removing any residual carbon from the powder. Stabilization of the powder is achieved by heating the powder to a predetermined temperature in a controlled atmosphere for a period of time. In one embodiment, the predetermined temperature is in a range from about 600° C. to about 1200° C. In a preferred embodiment, the predetermined temperature is in a range from about 800° C. to about 1000° C. In one embodiment, the period of heat treatment of the powder is in a range from about 1 hour to about 12 hours. In a preferred embodiment, the period of heat treatment of the powder is in a range from about 1 hour to about 6 hours. In one embodiment, the controlled atmosphere comprises, air, nitrogen, hydrogen, combinations thereof, and the like.

The following example illustrates the features of the invention, and is not intended to limit the invention in any way.

EXAMPLE 1

Luminescent nanomaterial 100 was prepared using the following steps: forming a homogenized precursor solution of at least one lanthanide group metal precursor and at least one lanthanide series dopant precursor; adding a phosphate source and a fuel to the precursor solution; removing water from the precursor solution to leave a reaction concentrate; and igniting the reaction concentrate to form a powder comprising the plurality of nanoparticles.

A 10 g batch of the composition of gadolinium lanthanum phosphate doped with cerium and terbium having 37 mole percent lanthanum, 20 mole percent gadolinium, 28 mole percent cerium, and 15 mole percent terbium was prepared. A precursor solution was prepared by dissloving hexahydrate lanthanum nitrate (6.65 g), hexahydrate gadolinium nitrate (3.75 g), hexahydrate cerium nitrate (5.05 g), and pentahydrate terbium nitrate (2.71 g) in 20 ml of water. The precursor solution was then homogenized by stirring. The pH of the precursor solution was adjusted to 0.5 by addition of water and nitric acid. Final volume of the precursor solution was 100 ml. Di-ammonium hydrogen phosphate (5.48 g) was mixed with the homogenized precursor solution, and glycine (6.23 g) was added to the solution. The solution was placed on a pre-heated hot plate and heated to a temperature of about 300° C. On heating, water was removed and a reaction concentrate was formed. Upon further heating, foaming of the reaction concentrate took place. With continuous heating, the foaming product was ignited and flamed to produce a voluminous and fluffy powder comprising the plurality of nanoparticles. The powder was then ground to make it homogeneous. The homogenized powder was then placed in an alumina crucible and heated at 1000° C. for 6 hours in a controlled atmosphere comprising of 1% hydrogen diluted with nitrogen. Flow rates of the hydrogen/nitrogen mixture was maintained at about 0.5 litres/hour. Following the heat treatment, X-ray diffraction was carried out to calculate the particle size of the powder. The mean particle size was 38 nm. Absorption and quantum efficiency of the powder were measured using a photoluminescence spectrometer. The quantum efficiency and absorption values of the so formed luminescent nanomaterial were found to be 92% and 82%. Spheroidal morphology 110 of the so formed powder was confirmed using TEM.

The luminescent nanomaterial 100 described hereinabove can be used in applications such as, display devices, fluorescent lamps, compact fluorescent lamps, linear fluorescent lamps, light emitting diodes, imaging applications, and pigment.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A luminescent nanomaterial, said luminescent nanomaterial comprising a plurality of nanoparticles, comprising at least one lanthanide group metal phosphate and at least one lanthanide series dopant, wherein each of said plurality of nanoparticles has a predetermined morphology, and wherein said luminescent nanomaterial has a quantum efficiency in a range from about 80% to about 100%.

2. The luminescent nanomaterial according to claim 1, wherein said luminescent nanomaterial has a quantum efficiency in a range from about 80% to about 90%.

3. The luminescent nanomaterial according to claim 1, wherein said luminescent nanomaterial has a quantum efficiency in a range from about 90% to about 100%.

4. The luminescent nanomaterial according to claim 1, wherein said luminescent nanomaterial has a quantum efficiency of at least 100%.

5. The luminescent nanomaterial according to claim 1, wherein said luminescent nanomaterial has an absorption value of at least 80%.

6. The luminescent nanomaterial according to claim 1, wherein said lanthanide group metal phosphate comprises at least one of gadolinium phosphate and lanthanum phosphate.

7. The luminescent nanomaterial according to claim 1, wherein said lanthanide group metal phosphate is one of lanthanum phosphate, gadolinium phosphate, gadolinium lanthanum phosphate, and combinations thereof.

8. The luminescent nanomaterial according to claim 1, wherein said at least one lanthanide series dopant comprises at least one of cerium, terbium, or combinations thereof.

9. The luminescent nanomaterial according to claim 1, wherein each of said plurality of nanoparticles has at least one dimension in a range from about 5 nm to about 500 nm.

10. The luminescent nanomaterial according to claim 9, wherein each of said plurality of nanoparticles has at least one dimension in a range from about 10 nm to about 200 nm.

11. The luminescent nanomaterial according to claim 9, wherein each of said plurality of nanoparticles has at least one dimension in a range from about 50 nm to about 100 nm.

12. The luminescent nanomaterial according to claim 1, wherein said predetermined morphology comprises at least one of a spheroidal morphology, an elongated platelet morphology, a rod-like morphology, or combinations thereof.

13. A luminescent nanomaterial, said luminescent nanomaterial comprising a plurality of nanoparticles, comprising at least one lanthanide group metal phosphate and at least one lanthanide series dopant, wherein each of said plurality of nanoparticles has a predetermined morphology, wherein said predetermined morphology comprises one of a spheroidal morphology an elongated platelet morphology, a rod-like morphology, or combinations thereof, wherein said luminescent nanomaterial has a quantum efficiency in a range from about 80% to about 100%, wherein said plurality of nanoparticles is formed by:
   a) forming a homogenized precursor solution of at least one lanthanide group metal precursor and at least one lanthanide series dopant precursor;
   b) adding a phosphate source and a fuel to said precursor solution;
   c) removing water from said precursor solution to leave a reaction concentrate; and
   d) igniting said reaction concentrate to form a powder comprising said luminescent nanomaterial.

14. The luminescent nanomaterial according to claim 13, wherein said luminescent nanomaterial has a quantum efficiency in a range from about 80% to about 90%.

15. The luminescent nanomaterial according to claim 13, wherein said luminescent nanomaterial has a quantum efficiency in a range from about 90% to about 100%.

16. The luminescent nanomaterial according to claim 13, wherein said luminescent nanomaterial has a quantum efficiency of at least 100%.

17. The luminescent nanomaterial according to claim 13, wherein said luminescent nanomaterial has an absorption value of at least 80%.

18. The luminescent nanomaterial according to claim 13, wherein said lanthanide group metal phosphate comprises at least one of gadolinium phosphate and lanthanum phosphate.

19. The luminescent nanomaterial according to claim 13, wherein said lanthanide group metal phosphate is one of lanthanum phosphate, gadolinium phosphate, gadolinium lanthanum phosphate, and combinations thereof.

20. The luminescent nanomaterial according to claim 13, wherein said at least one lanthanide series dopant comprises one of cerium, terbium, or combinations thereof.

21. The luminescent nanomaterial according to claim 13, wherein each of said plurality of nanoparticles has at least one dimension in a range from about 5 nm to about 500 nm.

22. The luminescent nanomaterial according to 21, wherein each of said plurality of nanoparticles has at least one dimension in a range from about 10 nm to about 200 nm.

23. The luminescent nanomaterial according to claim 21, wherein each of said plurality of nanoparticles has at least one dimension in a range from about 50 nm to about 100 nm.

24. A luminescent nanomaterial, wherein said luminescent nanomaterial has a quantum efficiency in a range from about 80% to about 100%, said luminescent nanomaterial comprising a plurality of nanoparticles, comprises comprising at least one lanthanide group metal phosphate and at least one lanthanide series dopant, wherein each of said plurality of nanoparticles has a predetermined morphology, and wherein said plurality of nanoparticles is formed by:

a) forming a homogenized precursor solution of at least one lanthanide group metal precursor and at least one lanthanide series dopant precursor;

b) adding a phosphate source and a fuel to said precursor solution;

c) removing water from said precursor solution to leave a reaction concentrate; and d) igniting said reaction concentrate to form a powder comprising said luminescent nanomaterial.

25. The luminescent nanomaterial according to claim 24, wherein said luminescent nanomaterial has a quantum efficiency in a range from about 80% to about 90%.

26. The luminescent nanomaterial according to claim 24, wherein said luminescent nanomaterial has a quantum efficiency in a range from about 90% to about 100%.

27. The luminescent nanomaterial according to claim 24, wherein said luminescent nanomaterial has a quantum efficiency of at least 100%.

28. The luminescent nanomaterial according to claim 24, wherein said luminescent nanomaterial has an absorption value of at least 80%.

29. The luminescent nanomaterial according to claim 24, wherein said lanthanide group metal phosphate comprises at least one of gadolinium phosphate and lanthanum phosphate.

30. The luminescent nanomaterial according to claim 24, wherein said lanthanide group metal phosphate is one of lanthanum phosphate, gadolinium phosphate, gadolinium lanthanum phosphate, and combinations thereof.

31. The luminescent nanomaterial according to claim 24, wherein said at least one lanthanide series dopant comprises at least one of cerium, terbium, or combinations thereof.

32. The luminescent nanomaterial according to claim 24, wherein each of said plurality of nanoparticles has at least one dimension in a range from about 5 nm to about 500 nm.

33. The luminescent nanomaterial according to claim 32, wherein each of said plurality of nanoparticles has at least one dimension in a range from about 50 nm to about 100 nm.

34. The luminescent nanomaterial according to claim 32, wherein each of said plurality of nanoparticles has at least one dimension in a range from about 50 nm to about 100 nm.

35. A method of making a luminescent nanomaterial comprising a plurality of nanoparticles comprising at least one lanthanide group metal phosphate and at least one lanthanide series dopant, wherein said plurality of nanoparticles has a predetermined morphology, the method comprising the steps of:

a) providing at least one lanthanide group metal precursor and at least one lanthanide series dopant precursor;

b) forming a homogenized precursor solution comprising said at least one lanthanide group metal precursor and said at least one lanthanide series dopant precursor;

c) adding a phosphate source and a fuel to said homogenized precursor solution;

d) removing water from said homogenized precursor solution to leave a reaction concentrate; and e) igniting said reaction concentrate to form a powder comprising said plurality of nanoparticles.

36. The method according to claim 35, wherein each of said lanthanide group metal precursor and said lanthanide series dopant precursor comprises at least one of an oxide, an acetate, and a carbonate precursor of a lanthanide group metal.

37. The method according to claim 36, wherein the step of forming a homogenized precursor solution of at least one lanthanide metal group precursor comprises:

a) reacting the at least one lanthanide metal group precursor and the at least one lanthanide series dopant precursor with a nitrate source to form a lanthanide nitrate; and b) dissolving the lanthanide nitrate in water.

38. The method according to claim 37, wherein the nitrate source comprises at least one of nitric acid and ammonium nitrate.

39. The method according to claim 35, wherein said lanthanide group metal precursor and said lanthanide series dopant precursor each comprise a nitrate precursor of a lanthanide group metal.

40. The method according to claim 35, wherein said homogenized precursor solution is formed by dissolving said at least one lanthanide group metal precursors and said at least one lanthanide series dopant precursor in water.

41. The method according to claim 35, wherein said homogenized precursor solution has a pH in a range from about 0.5 to about 5.

42. The method according to claim 41, wherein said pH is in a range from about 1 to about 3.5.

43. The method according to claim 35, wherein said phosphate source comprises at least one of di-ammonium hydrogen phosphate, phosphoric acid, and boron phosphate.

44. The method according to claim 35, wherein said fuel is a carbon source.

45. The method according to claim 44, wherein said carbon source is urea.

46. The method according to claim 44, wherein said carbon source is glycine.

47. The method according to claim 44, wherein said carbon source is hydrazine.

48. The method according to claim 37, wherein said fuel and said lanthanide nitrate are present in said homogenized precursor solution, in a ratio in a range from about 1:2 to about 2:1.

49. The method according to claim 35, wherein said homogenized precursor solution is ignited by a microwave oven.

50. The method according to claim 35, wherein said homogenized precursor solution is ignited by a furnace.

51. The method according to claim 35, wherein said homogenized precursor solution is ignited by a hot plate, heated to a predetermined temperature, wherein said predetermined temperature is in a range from about 200° C. to about 500° C.

52. The method according to claim 51, wherein said predetermined temperature of is in a range from about 200° C. to about 300° C.

53. The method according to claim 35, further comprising the step of homogenizing said powder.

54. The method according to claim 35, further comprising the step of homogenizing said powder, wherein the step of homogenizing said powder comprises at least one of grinding and milling said powder.

55. The method according to claim 35 further comprising the step of stabilizing said powder, wherein the step of stabilizing comprises heating said powder to a predetermined temperature in a controlled atmosphere for a period of time, wherein said predetermined temperature is in a range from about 600° C. to about 1200° C.

56. The method according to claim 55, wherein said predetermined temperature is in a range from about 800° C. to about 1000° C.

57. The method according to claim 55, wherein said controlled atmosphere comprises at least one of air, nitrogen, hydrogen, and or combinations thereof.

58. The method according to claim 55, wherein said period of time is in a range from about 1 hour to 12 hours.

59. The heat treatment according to claim 58, wherein said period of time is in a range from about 1 hour to 6 hours.

* * * * *